United States Patent
DeVilbiss et al.

(10) Patent No.: US 7,786,438 B1
(45) Date of Patent: Aug. 31, 2010

(54) SENSOR ASSEMBLIES USING REDUNDANT TWO-DIMENSIONAL DETECTOR ARRAYS

(75) Inventors: Nathan DeVilbiss, Sandia Park, NM (US); Ryan Olcott, Rio Rancho, NM (US); Peter Thomas, Albuquerque, NM (US); Gregory Spanjers, Sandia Park, NM (US); James Winter, Albuquerque, NM (US); Jason Guarnieri, Albuquerque, NM (US); Timothy Klatt, Albuquerque, NM (US); Holly Victorson, Albuquerque, NM (US); Thomas Roberts, Albuquerque, NM (US); Robert Thompson, Marina Del Rey, CA (US)

(73) Assignee: The United States of America as represented by the Secretary of the Airforce, Washington, DC (US)

( * ) Notice: Subject to any disclaimer, the term of this patent is extended or adjusted under 35 U.S.C. 154(b) by 283 days.

(21) Appl. No.: 12/176,490

(22) Filed: Jul. 21, 2008

(51) Int. Cl.
*G01J 5/00* (2006.01)
(52) U.S. Cl. ...................................... 250/332
(58) Field of Classification Search ................. 250/330, 250/332, 339.02
See application file for complete search history.

(56) References Cited

U.S. PATENT DOCUMENTS

| | | | | |
|---|---|---|---|---|
| 6,011,876 A | * | 1/2000 | Kishner | 382/284 |
| 6,919,568 B2 | * | 7/2005 | Odogba et al. | 250/370.09 |
| 2006/0256321 A1 | * | 11/2006 | Dolne et al. | 356/121 |
| 2008/0056606 A1 | * | 3/2008 | Kilgore | 382/275 |

* cited by examiner

*Primary Examiner*—David P Porta
*Assistant Examiner*—Marcus H Taningco
(74) *Attorney, Agent, or Firm*—Kenneth E. Callahan (57) ABSTRACT

A sensor assembly that replaces a single focal plane array detector with two focal plane array detectors orientated with respect to each other such that a power splitter divides an incoming light source equally between each detector. The two detectors are selected such that the locations of poorly-operating pixels in each detector do not overlay. The output signals of each detector are then electronically or analytically combined to yield 100 percent operability. Separate switchable wavelength filter wheels having one or more different wavelength filters may be positioned between the power splitter and each of the detectors. The power splitter may be replaced by a polarization splitter. One detector can be translated perpendicular to the incoming light source relative to the second detector to compensate for new poorly-operating pixels and/or to improve the spatial resolution.

9 Claims, 8 Drawing Sheets

Short Integration Cycle for FPA - B

Long Integration Cycle for FPA - A

FPA A

Poorly-Operating Pixels

FPA B

No Poorly-Operating Pixels

FPA A/B OVERLAY

Poorly-Operating Pixels Obviated

FIG. 8

SENSOR ASSEMBLIES USING REDUNDANT TWO-DIMENSIONAL DETECTOR ARRAYS

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The invention relates generally to detector arrays and, in particular, to the use of redundant two-dimensional (2-D) detector arrays in sensor assemblies to improve performance and operability over that obtainable from a single detector.

Figure 1:
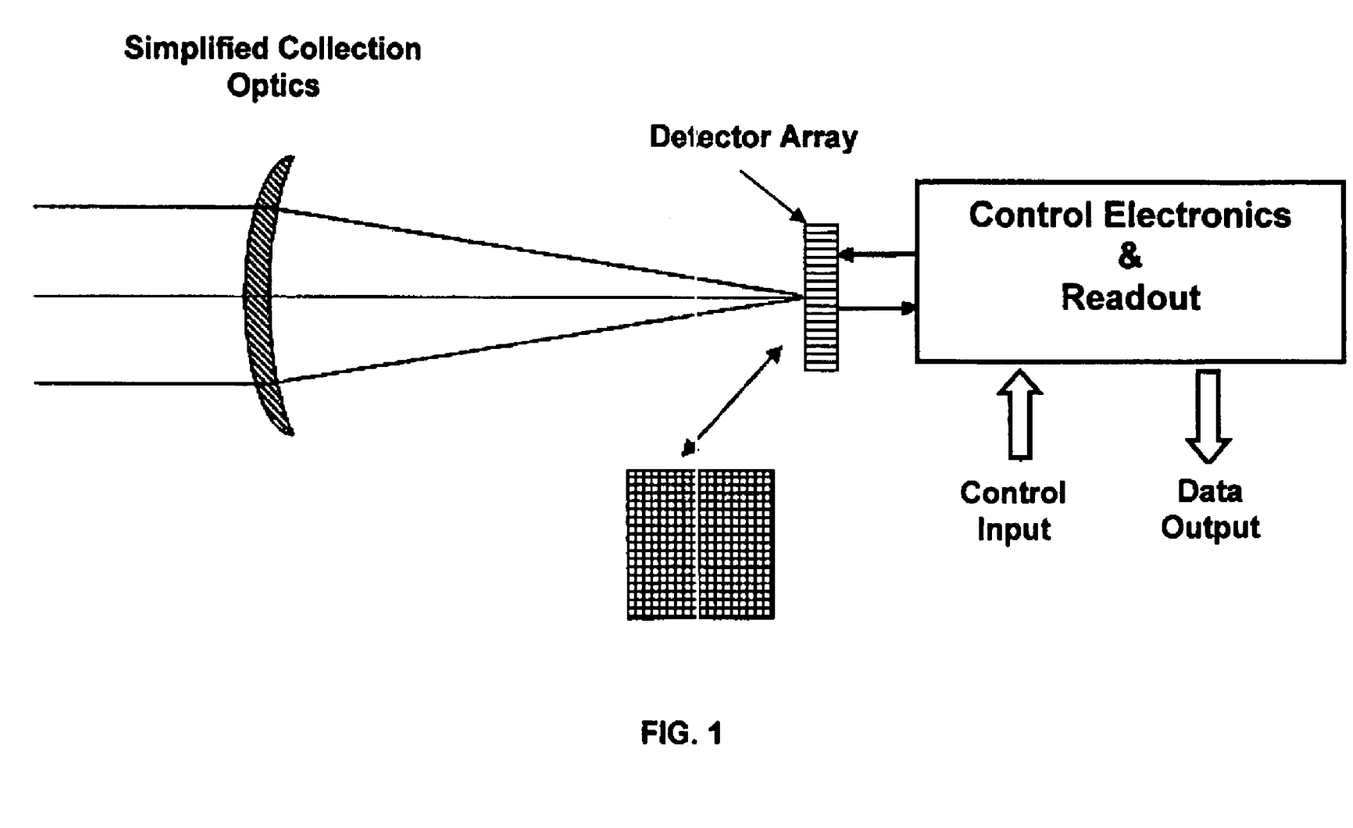
FIG. 1 shows a typical sensor with simplified optics and a single 2-dimensional detector array.

A simplified sensor assembly design is shown in FIG. 1. In practice, the sensor assembly would have several optical elements, the net result of which is to focus the light onto the detector array and form an image. While a simplified refractive sensor assembly design is shown in FIG. 1, mirrors could also be used for image formation.

In the specific case of infrared (IR) sensing, the typical detectors used are Focal Plane Arrays (FPAs). The FPA is the major design driver in the infrared sensor. The number of pixels (individual sensing elements) in the FPA ultimately dictates the spatial resolution of the sensor; therefore, a sensor designer will generally seek to maximize the pixel count when selecting the FPA. Unfortunately, as pixel count increases, the likelihood of FPA manufacturing defects also increases. The measure of quality is "operability," defined herein as the percentage of the pixels that are functional and produce an electrical response to incident light within a specified operating range of wavelength, photon fluence, and temperature. A decrease in manufacturing quality is experienced in two primary ways: individual pixels will be non-functional and have no output; or individual pixels will have a very low or very high output electrical response to incident energy. An example "operability" specification might read, "The FPA will have 0.90 operability when 90% of all pixels have quantum efficiency (QE) greater than 25% of the median QE value."

State of the Art IR FPAs have over 4-million pixels in array sizes of 2048×2048 (commonly abbreviated as 2k×2k). To manufacture high-quality FPAs, industry typically produces large batches that are screened to select the few FPAs with operability greater than 90%. To illustrate the manufacturing difficulty, to date few 2k×2k FPAs have been produced with greater than 95% operability and no 2k×2k infrared FPA has been built with 100% operability.

FPA operability over 90% is acceptable for many applications. There are a few critical applications, however, where perfect or near-perfect operability is required. An example might be the use of IR FPAs for missile detection from spacecraft. In this application, the need for high operability is based on the size of the target with regard to pixel size. Because such a target may be contained within a single pixel, dead (non-working) pixels corresponding to blind spots in the field-of-view would result in a failure to detect the missile. The blind-spot problem is exasperated when dead pixels are contiguous causing clumps of outages, which is a common manifestation of the manufacturing defects in IR FPAs.

For applications that can tolerate the use of FPAs with typical 90% to 95% pixel operability, a sensor design using even lower quality FPAs could be advantageous. Such a design would reduce the long lead times needed for the batch screening process (typically 12 months) and reduce cost since fewer FPAs need to be manufactured in the batch process. The system reliability of such a design would also be improved, allowing for redundant strings or graceful degradation.

SUMMARY

The present invention discloses a technique whereby lower-quality focal plane arrays (FPAs) are used to produce a detector assembly with equal or higher performance than an individual FPA with greater than or equal to 99% operability. The general technique calls for the sharing of the incoming light signal between two detectors that are optically overlaid and chosen so that the poorly-operating pixels on one detector are optically aligned with good pixels on the other detector. In this manner blind spots are eliminated. Five distinct manifestations of the concept are disclosed, each with unique traits that can make it the optimal choice for a specific application:

In concept 1 the incoming energy is optically split onto two detectors rigidly connected to an optical power splitter to produce a pixel map with an effective operability of 100%. In the concept 2, the concept 1 detector has a switchable wavelength filter between the optical splitter and the detectors. Typically the filters will be used so that the two detectors sample different wavelengths of incoming light. At regular time intervals, the filters will be changed to the same wavelength to produce 100% operability, similar to the approach used in concept 1.

In concept 3, concept 1 is modified to use light polarization to optically split the incoming light to potentially reduce background clutter on one of the detectors. In concept 4, the integration times of the two detectors in concept 1 are set at different speeds to increase the sensor dynamic range, while still achieving 100% operability. Finally, in concept 5, one or both of the concept 1 detectors are translated in a direction perpendicular to the incoming light. This approach achieves the 100% operability of concept 1 and also creates a higher pixel density to increase the spatial resolution of the sensor.

DESCRIPTION OF THE PREFERRED EMBODIMENT

Concept 1: Incoming energy is optically split onto two optically aligned detectors rigidly connected to an optical power splitter to electronically produce a pixel map with an effective operability of 100%.

Figure 2:
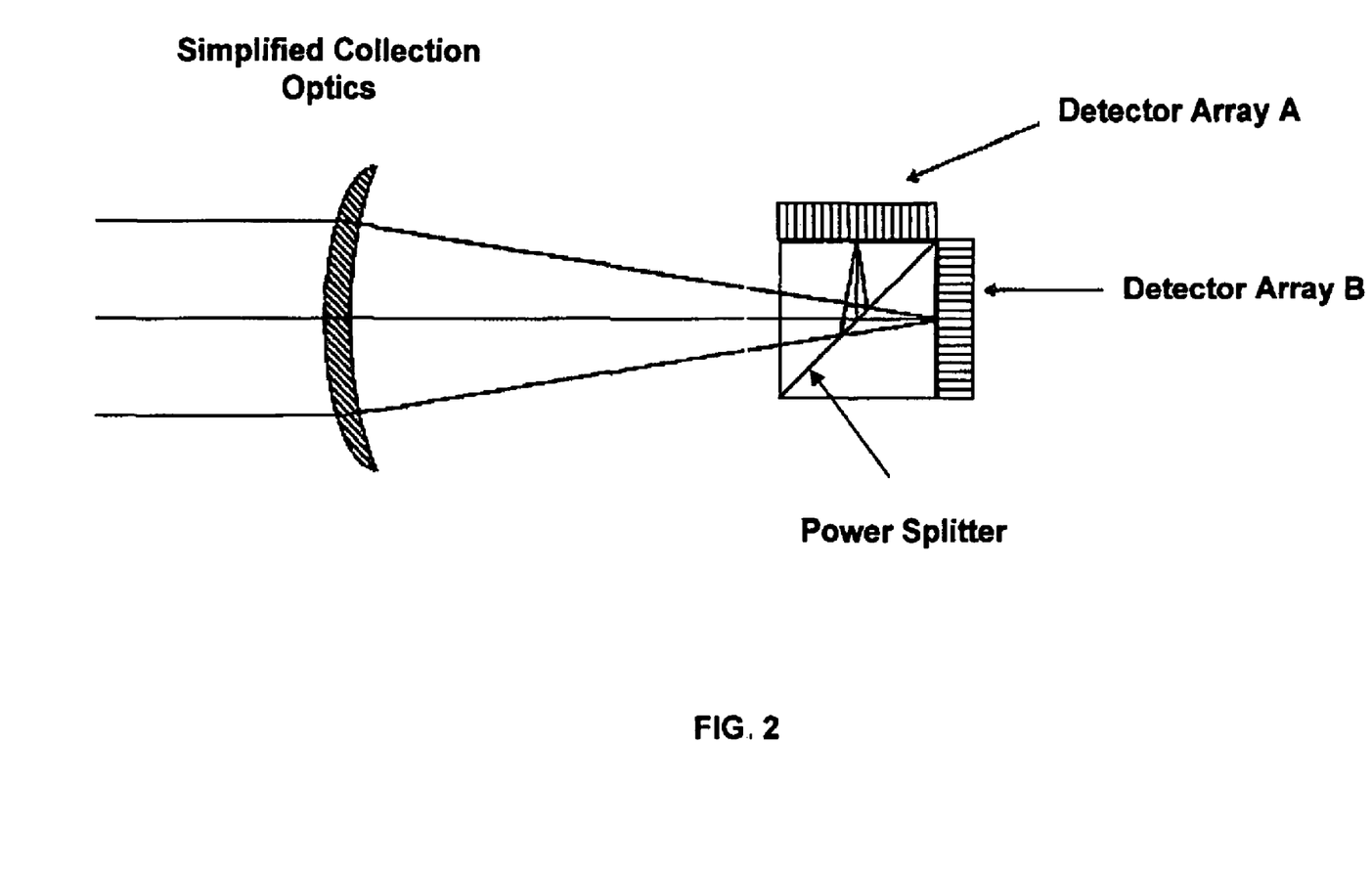
FIG. 2 is a diagram of concept 1 in which an optical power splitter is used to split the incoming light onto two optically aligned detectors, Array A and Array B.
Figure 3A:
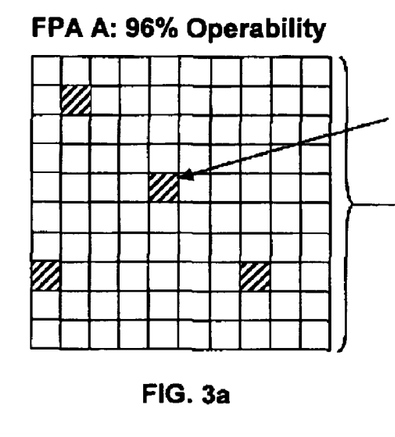
FIG. 3 is an example of two analytically overlaid detector arrays wherein the locations of poorly-operating pixels of focal plane array A (FPA A) (3a) differ from the locations of poorly-operating pixels of FPA B (3b) yielding a perfect focal plane array (3c) when the outputs of FPA A and FPA B are electronically integrated.
Figure 3B:
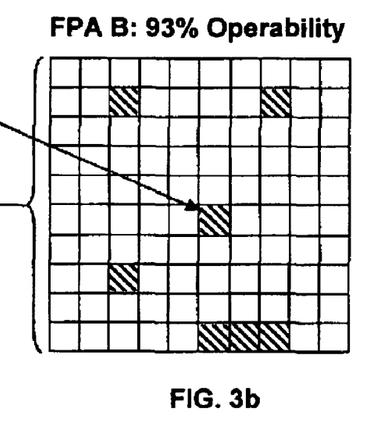
Figure 3C:
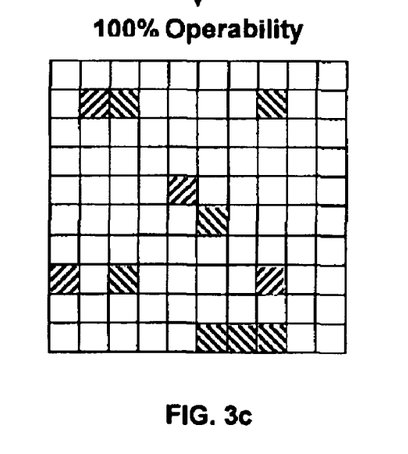

In this embodiment the incoming light is power split onto two image planes each containing a two-dimension (2-D) focal plane array (FPA) detector as shown in FIG. 2. The detectors are optically aligned such that a point source would illuminate a pixel at the same (x, y) location in each detector. It is critical to select two detectors such that there is no overlap in their poorly-operating pixels. An example of this is shown in FIG. 3 where the outputs of two representative 2-D detector arrays are analytically overlaid. FIG. 3a is a 10×10 FPA with four poorly-operating pixels yielding 96% operability. FIG. 3b is a second 10×10 FPA with 7 poorly-operating pixels for 93% operability. None of the physical locations of the poorly-operating pixels are the same in the two FPAs as shown in FIG. 3c. Analytically combining the outputs of the two FPAs yields a single effective FPA with 100% operability, i.e., the signal from the two detectors is combined and used in place of the output of a single detector. The combining of the signals from the two detectors can be performed electrically or analytically in the post-processing of the data.

Note in FIG. 3 that both detector A and B have operability over 90%, which would seem to be very good. However if you consider this operability on modern 2048×2048 pixel (~4 Mp) FPAs, a 99.9% operability corresponds to over 4000 poorly-operating pixels. For missions such as missile detection from a geosynchronous orbit in space where the wide-field-of-view sensor is used to accomplish full-earth coverage, having 4000 "blind spots" is not acceptable. Concept 1 can be employed to meet the requirements for this critical space mission using currently manufactured FPAs. The second feature to note in FIG. 3 is that 100% operability can potentially be achieved with much lower quality FPAs, although more detector screening may be required to select the properly matched pair. The ability to use lower quality FPAs in an IR sensor would significantly reduce cost and schedule. Therefore it may be attractive to use the disclosed technique in sensors that do not have rigorous operability requirements, simply to reduce cost and schedule.

Using the nomenclature from FIG. 2 where the detectors are labeled "A" and "B", the effect on performance can be estimated. The key metric is the ratio of signal to noise (S/N). The signal is from the target to be sensed. Noise is from a range of infrared and electronic sources including background light near the target, infrared emission from the sensor optics, light scattering within the sensor, electronic read-noise variance in the detector, and dark current in the detector. For a properly designed sensor used in a missile detection application the dominant noise will be background IR emission. Since the background IR noise and the target IR signal both have sources external to the sensor assembly, both will be split equally between the image planes. Therefore the sensor sensitivity using Concept 1 will be S/N, unchanged from the single detector case. Once detector dependent noise terms such as dark current and electron read noise are included, Concept 1 will experience a slight decrease in sensitivity (as measured by S/N) since the detector dependent sources are effectively doubled, while the target IR emission remains constant. For missile detection applications, this slight loss in sensitivity will be acceptable considering the concomitant decrease in blind spots.

Concept 2: Concept 1 but with switchable wavelength filter between the optical splitter and the detectors.

Typically the filters will be used so that the two FPA detectors sample different wavelengths of incoming light. At regular time intervals, the filters will be changed to the same wavelength to produce 100% operability, similar to the approach used in Concept 1.

Figure 4:
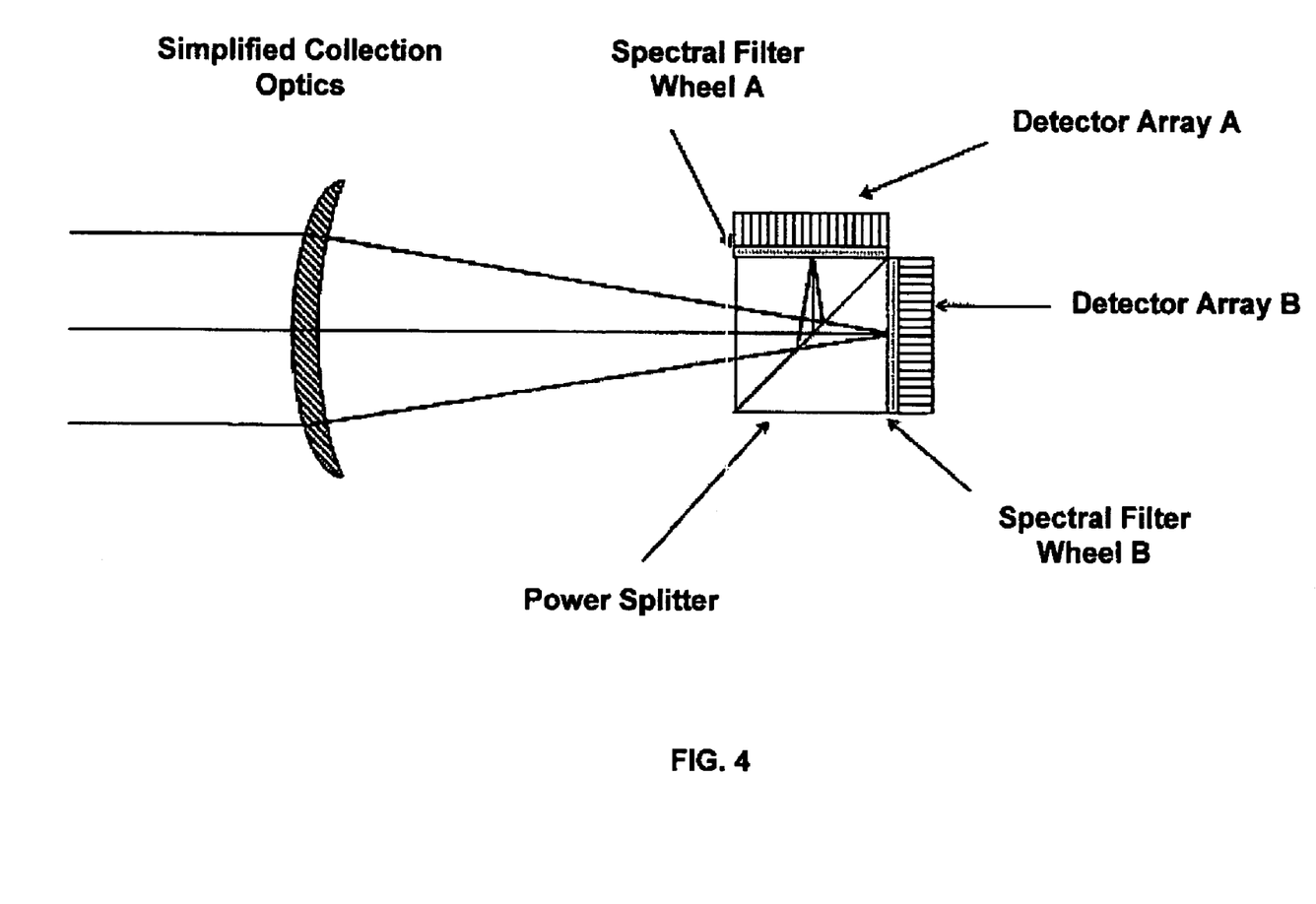
FIG. 4 is a concept 1-type diagram in which switchable wavelength filters are positioned between the power splitter and the detectors.

Concept 2 takes advantage of typical detection operations wherein it is only necessary to sample a target's emission at discreet intervals, known as "revisit rates." In addition it is often desired to sample a target at multiple wavelengths. In this application a sensor assembly will be designed with two image planes each containing detector arrays. For dual wavelength sampling as in concept 1, the incoming light is split between two image planes. Identical fixed wavelength filters may be placed in each image path between the optical splitter and the detector array for target detection at a desired frequency or band. For Concept 2, filter wheels as shown in FIG. 4 are placed in each image path between the optical splitter and the detector array.

The concept of operation is as follows: Detector A is set for wavelength "1" and detector B is set for wavelength "2". For this example assume that wavelength "1" is the most critical for the mission and requires 100% operability. If the required revisit rate for wavelength "1" is 1 second (for example), then detector B is set for wavelength "2" for some fraction of the revisit rate (e.g. 0.75 seconds). For the remaining fraction of the revisit rate (e.g. 0.25 seconds), the filter wheel is commanded to turn so as to pass wavelength 1. For the next 0.25 seconds, detector B provides the same wavelength coverage as detector A, yielding 0.25 seconds of 100% coverage of wavelength 1. After the 0.25 seconds of simultaneous coverage at wavelength 1, the detector B filter wheel is commanded back to wavelength 2, and the process repeats.

Considering the example above, the performance of Concept 2 can be estimated. For pixels where both detector A and B have acceptable operability, the sensitivity will be as described for Concept 1, unchanged from the 1-detector sensor assembly provided we ignore the small noise terms that arise specifically from the detector. For the opposite extreme, the case where detector A has a poorly-operating pixel at a location and detector B provides the only detection, the sensor performance is degraded because detector B is only available to provide signal for a fraction of the revisit rate. This decrease in sensitivity can again be a good trade in exchange for 100% operability over the coverage area.

Many variations of Concept 2 can easily be derived from the basic idea, including filter wheels placed in the optical paths of both detectors A and B, with various wavelengths. Another variation would be to design a filter wheel for only one detector. In this manner, detector A could process data only in one primary wavelength, and detector B could switch to the primary or various secondary wavelengths as commanded. In addition to regularly timed switching, the filter wheels could also be designed to be switched when commanded, either autonomously when the processing electronics generates a command or via a ground operator.

Concept 3: Concept 1 modified to use light polarization to optically split the incoming light to potentially reduce background clutter on one of the detectors.

Figure 5:
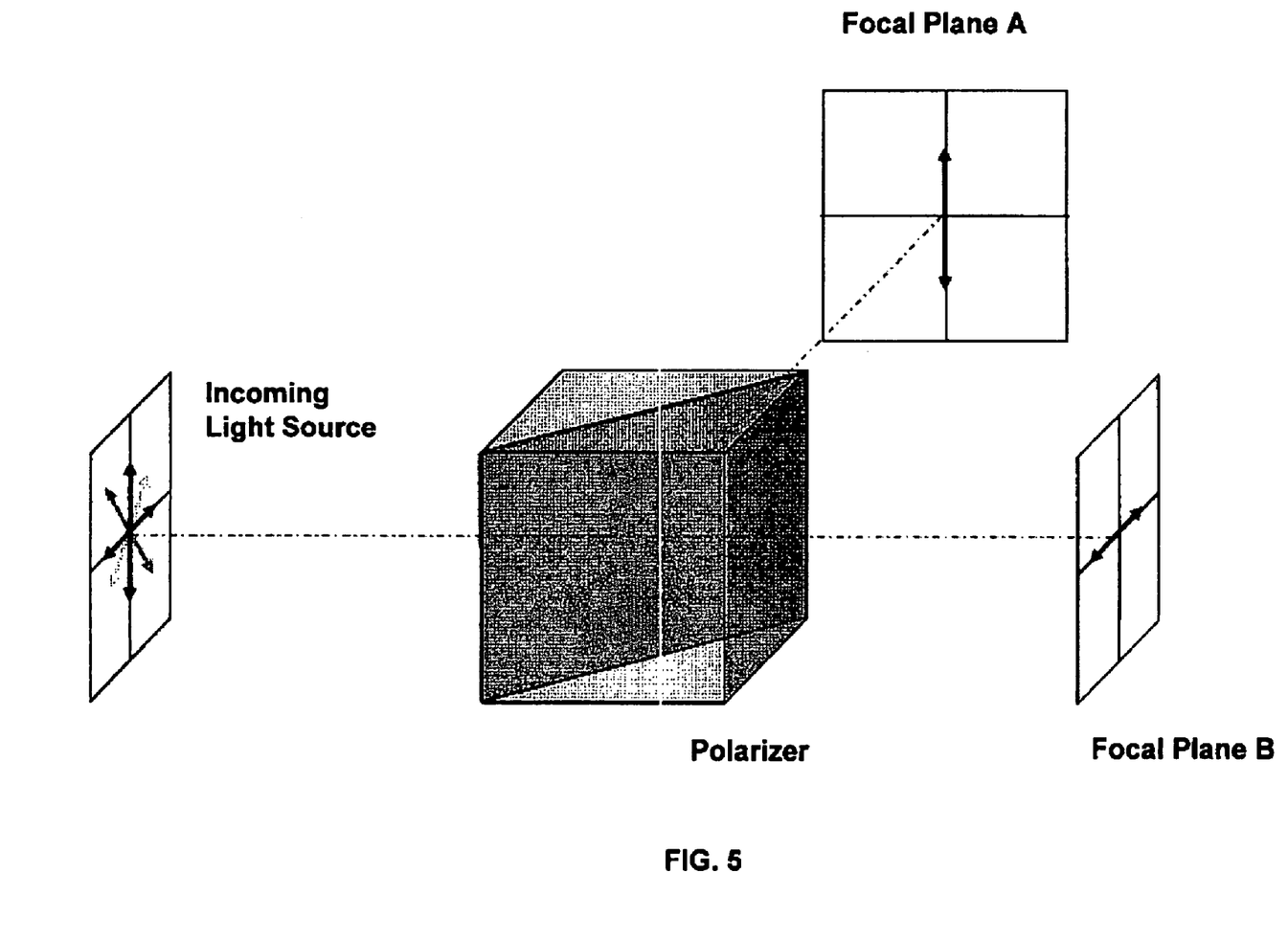
FIG. 5 is a concept 1-type diagram in which light polarization is used to optically split incoming light that is then projected onto the two FPAs.

In Concept 3 the power splitter used to share the incoming light between the 2 detectors in Concept 1 is replaced with a splitter that separates the incoming light based on their polarization, as shown in FIG. 5. Concept 3 is described as a variation on Concept 1; however, it could also be used with the wavelength selection filters described in Concept 2. The Concept 3 design has unique advantages in applications where a target must be discriminated amidst background light in the same wavelength bands as the target. For many cases, such as missile detection in the infrared, the target emission is unpolarized. The background however can have a significant contribution that is polarized. One example is the case where the background light is from sunlight reflected off of high clouds with a significant population of ice crystals.

Unlike Concept 1 and 2 where performance may be slightly degraded to achieve 100% operability, Concept 3 can provide 100% operability and increased S/N. At worst, the two detectors will have polarization views that offer no advantage in discrimination when compared to the single detector case, albeit operability will increase due to the redundant detection. At best in Concept 3, one detector will have high background light noise while the other detector will have significantly reduced background light noise by filtering out a polarization-dependant emission source. In this scenario Concept 3 can realize sensitivity increases of about 10 times by reducing a high background environment to a normal background.

Concept 4: Concept 1 where the integration times of the two detectors are set at different speeds to achieve 100% operability and also increase the sensor dynamic range.

For a sensor used in an application such as missile detection, the sensor is required to have a very large dynamic range in order to properly detect targets as disparate as bright intercontinental missiles down to dim short-range theater missiles. A single detector sensor can accomplish this dynamic range by adjusting the time over which the detector collects incoming light. This parameter is typically referred to as the "integration time." To achieve good sensitivities for dim targets, many frames at long integration times are added to increase the S/N. The brightest targets at these same long integration times would cause the detector to saturate and possibly "bloom" the response over neighboring pixels, thereby significantly decreasing the spatial resolution of the sensor. Accordingly, bright targets are sensed by collecting a few frames at very short integration times. In practice, the detector is commanded to operate in what is called a "ping-pong" mode where short and long integration time frames are interspersed. This operation causes complexity at both the detector control electronics (which must make rapid changes to the integration times) and the sensor data collection electronics (which must separate the long and short frames and then apply two different analysis techniques).

Figure 6:
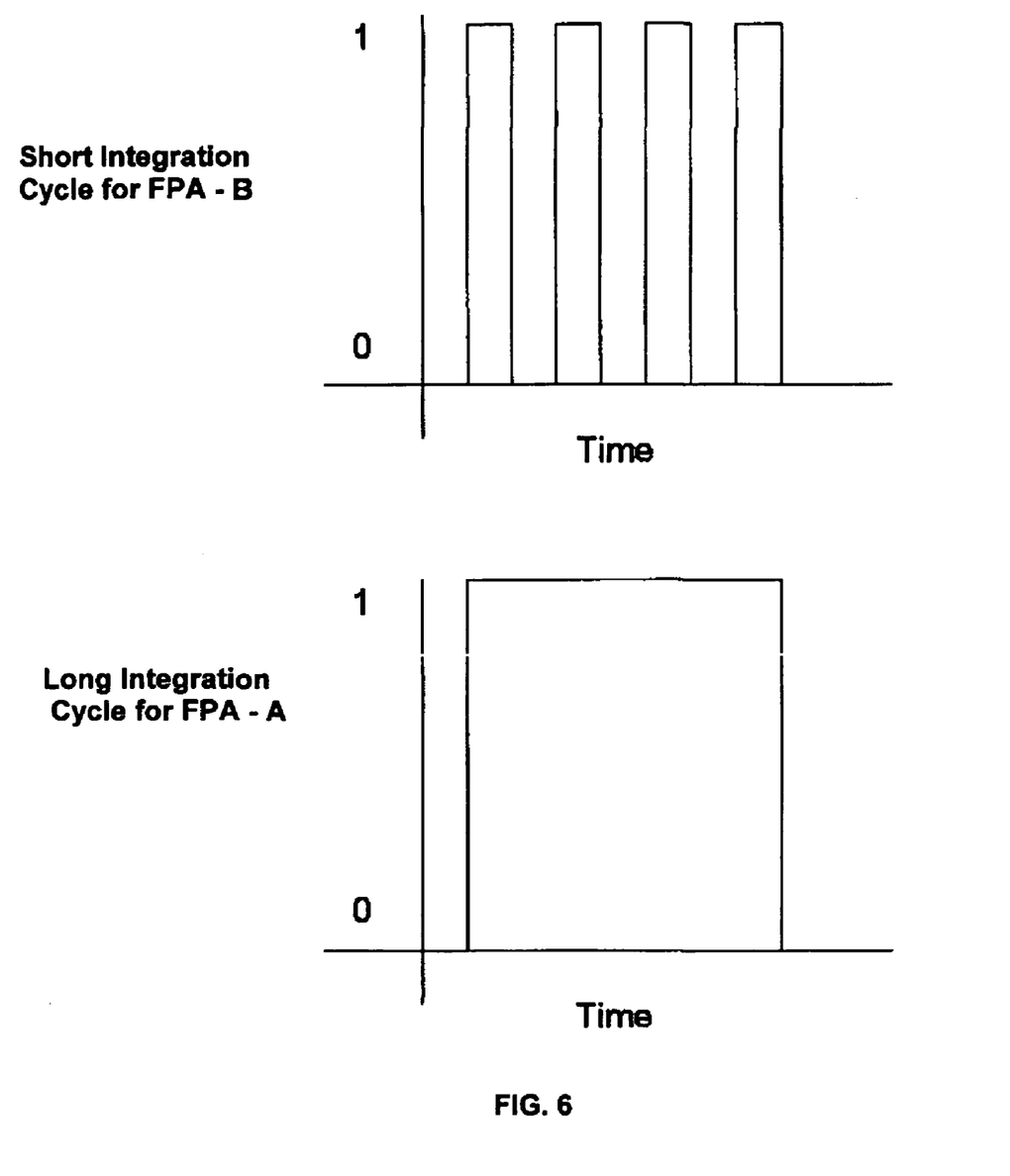
FIG. 6 depicts a long FPA A integration cycle and a short FPA B integration cycle.

Concept 4 provides high dynamic range and simplified operation by operating the two detectors from Concept 1 at two different integration times, as shown in FIG. 6. In FIG. 6, detector "A" will be commanded for long integration times and optimized for the high sensitivity needed to discriminate dim targets. Detector "B" will be set for short integration times and optimized to sense the brightest targets without detector saturation or blooming. For cases where the target illuminates healthy pixels at both image planes, the performance is approximately equal to that of a typical single-detector sensor. The relative intensities of the dominant light sources, target and background, remains unchanged assuming an ideal optical power splitter. The relative noise contribution from the detector will cause a slight decrease in the sensor S/N. For cases where the target illuminates a poorly-operating pixel on one of the detectors, there will be significant performance degradation. However, there will be no blind spots.

This concept could be further expanded upon by adding dynamic integration time control to one or both detectors. For instance, control logic could command detector B to shorten its integration time in response to pixels exceeding a specified saturation rate. This would be less taxing in terms of electronics resources, since there would be much less "switching," and it would also provide users with a more flexible detection system. This automated switching of integration times could be done after a variable, yet predetermined, number of camera frames to reduce the software overhead and to increase sensitivity to bright and dim targets moving relative to the field of view of the sensor.

Concept 5: Concept 1 where one (or both) of the detectors can be translated in a direction perpendicular to the incoming light.

Figure 7:
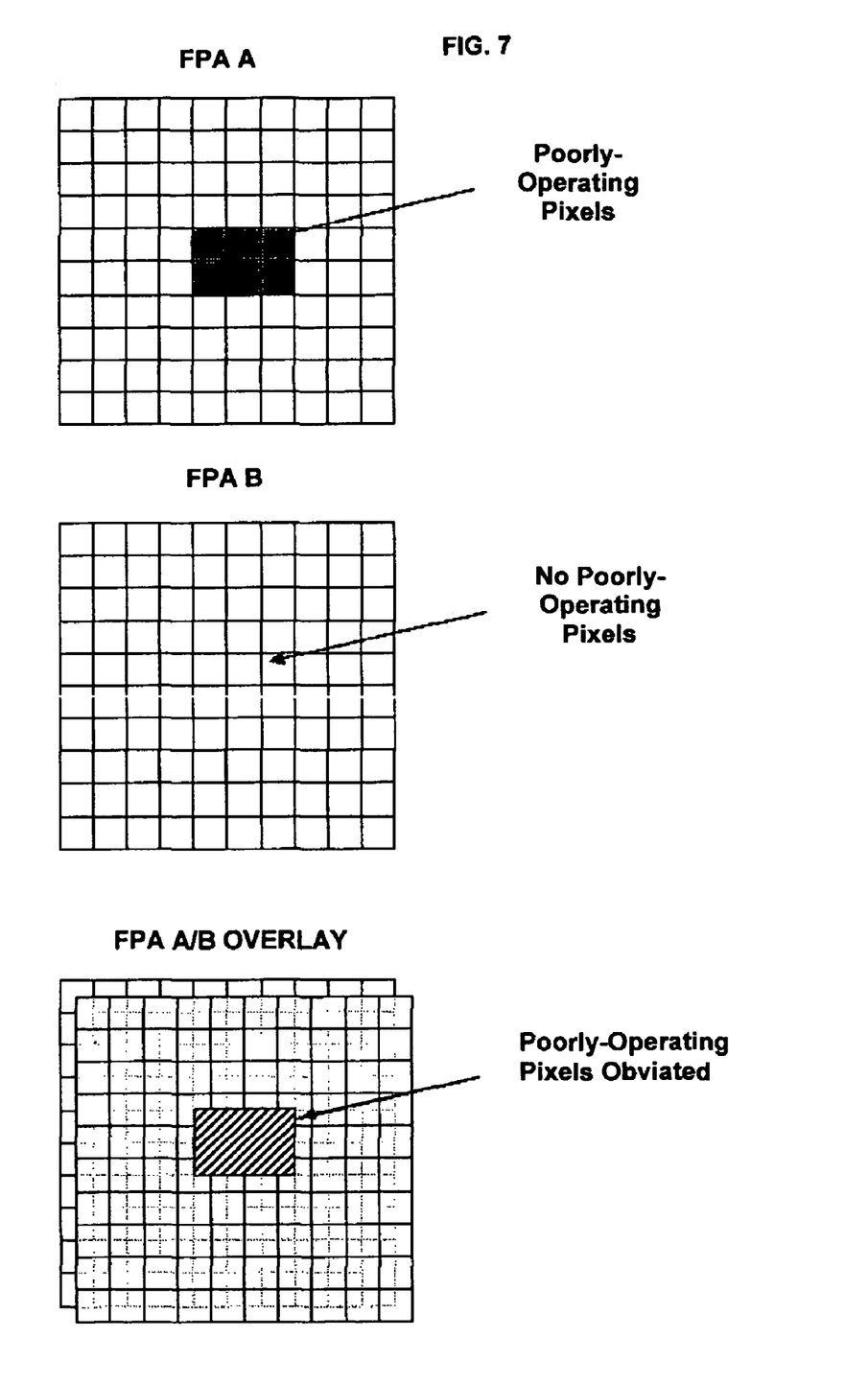
FIG. 7 shows the translation of FPA B relative to FPA A to obviate poorly-operating pixels on FPA A.

In Concept 5, shown in FIG. 7, a detector is mounted on a translation stage that can be commanded to move the detector small displacements perpendicular to the direction of the incoming light. In FIG. 7 FPA B is offset from FPA A to obviate the poorly-operating pixels on FPA A. The translation stage has two primary advantages. First, if a detector experiences a pixel failure during the mission such that poorly-operating pixels now optically aligned on both detectors, one detector array can be translated to find a new position which creates 100% sensor operability. Second, the detectors can be offset by a distance equal to ½ of the pixel dimension to effectively increase the pixel density and thereby improve the spatial resolution of the sensor. For a typical pixel dimension of 20 microns, the required translation range is modest. Note that spatial resolution in this manner could also be accomplished by mounting FBA B somewhat offset from FPA A without a dynamic translation stage.

Concept 5 can address some of the design drawbacks of Concepts 1-4. That is, if the arrays are not aligned perfectly in Concepts 1-4, the designer needs to deal with the need to "boresight" the pixel arrays, as shown in FIG. 7. However, with Concept 5, one or both FPAs can be adjusted on-orbit such that the arrays are nearly perfectly aligned with each other.

Figure 8:
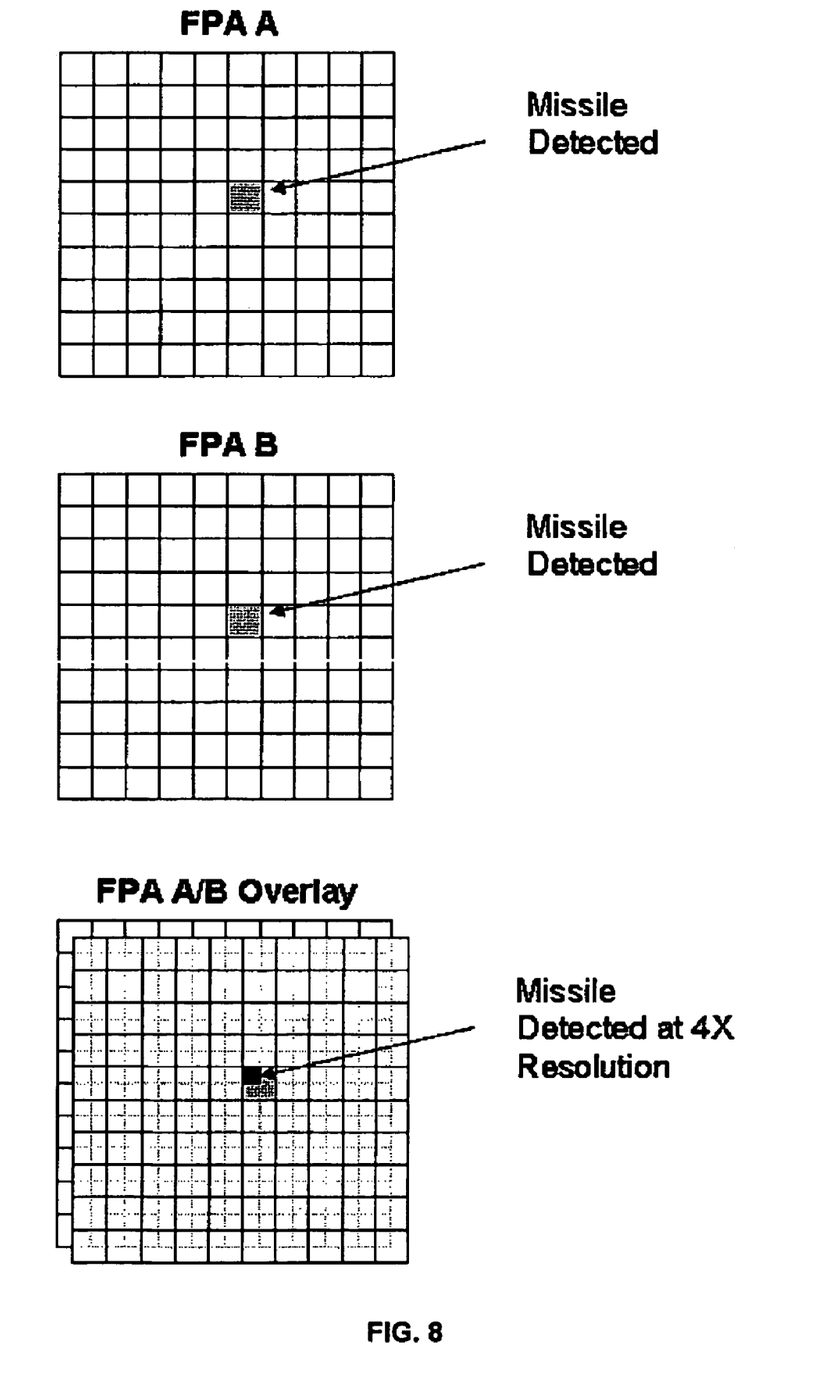
FIG. 8 shows the translation of FPA B relative to FPA A to achieve 4× resolution.

Concept 5 is expected to have noise performance ideally 2× better than a sensor with a single detector, and ½ as good as a sensor with a detector that has 4× higher pixel density. The performance capability of Concept 5 can be estimated by considering a target illuminating a position on the optically-overlapped detectors as shown in FIG. 8 where detectors A and B are offset both vertically and horizontally by ½ the pixel dimension, and where the light from the target illuminates the intersecting area of pixels A(n, m) and B(n, m). Also consider the simplified case where after processing each detector independently, it is found that the target signal is completely contained within the optical intersection of the pixels A(n, m) and B(n, m), and therefore within an area equal to ¼ the area of each of these pixels. If the performance of each of the two detectors is denoted as $(S/N)_2$, then the performance of the Concept 5 design is ¼ $((S/N)_A+(S/N)_B)$=½ $(S/N)_2$ or, the performance of Concept 5 is twice as good as a single detector sensor. By comparison, a single-detector sensor with a detector having four times the pixel count (e.g. a single 4k×4k FPA instead of two 2k×2k FPAs) would have four times better performance, or ¼ $(S/N)_2$. This assumes a target image much smaller than the pixel dimension and uniform background noise intensity.

Concept 5 will also have improved spatial resolution over the single-detector sensor design. Although many algorithms can be envisioned for centroiding a target image based on the signal received by the two optically-overlapped, yet offset detectors, the simplest case is to simply determine the target centroid on each of the two detectors independently. The two detector centroids can then be compared to identify the quadrant of a specific pixel which contains the target centroid. In this manner, Concept 5 can approach the spatial resolution of a single-detector sensor assembly with 4× the pixel count. Specifically, a Concept 5 sensor based on 2k×2k FPAs will approach the spatial resolution of a sensor using a single 4k×4k FPA for the same field of view.

The invention claimed is:

1. A two-dimension (x, y) focal plane array detector system having a first detector optically aligned with a second detector and orientated with respect to each other such that a power splitter divides an incoming light source equally between each detector, each focal plane array detector comprised of pixels with a portion of said pixels at known locations being poorly-operating pixels and each detector being selected such that none of the locations of the poorly-operating pixels of said first detector electronically correspond to the positions of the poorly-operating pixels of said second detector, and further an output signal from each of the detectors is electrically or analytically combined, whereby blind spots are eliminated.

2. The focal plane array detector system of claim 1, wherein a separate switchable wavelength filter wheel having one or more different wavelength filters is positioned between said power splitter and each of said detectors.

3. The focal plane array detector system of claim 2, wherein each of said switchable wavelength filter wheels may be independently switched to desired wavelengths by command.

4. The focal plane array detector system of claim 1, wherein the said incoming light is optically split between said first and second detectors by a polarization splitter.

5. The focal plane array detector system of claim 4, wherein a separate switchable wavelength filter wheel having one or more different wavelength filters is positioned between said polarization splitter and each of said detectors.

6. The focal plane array detector system of claim 1, wherein said first detector has a first integration time and said second detector has a second integration time different from the first integration time.

7. The focal plane array detector system of claim 6, wherein said first and second integration times are varied by command.

8. The focal plane array detector system of claim 6, wherein said integration time of said first detector and or said second detector is varies in response to one or more pixels in said first or said second detector exceeding a specified saturation value.

9. The focal plane array detector system of claim 1, wherein said first detector can be translated perpendicular to said incoming light source relative to said second detector by command, whereby the resolution is increased and/or new poorly-operating pixels are compensated for.

* * * * *